United States Patent [19]

Endo

[11] 4,073,270
[45] Feb. 14, 1978

[54] ELECTRONICALLY-CONTROLLED FUEL INJECTION SYSTEM

[75] Inventor: Kunio Endo, Anjo, Japan

[73] Assignee: Nippondenso Co., Ltd., Kariya, Japan

[21] Appl. No.: 699,608

[22] Filed: June 24, 1976

[30] Foreign Application Priority Data

July 2, 1975 Japan .................................. 50-82125

[51] Int. Cl.² .............................. F02B 3/10; G06G 7/70
[52] U.S. Cl. .............................. 123/32 EB; 123/32 EC; 123/32 EF; 364/431
[58] Field of Search ........ 123/32 EA, 32 EB, 32 EC, 123/32 EF; 235/150.2, 150.21

[56] References Cited

U.S. PATENT DOCUMENTS

| 3,809,029 | 5/1974 | Wakamatsu et al. | 123/32 EA |
| 3,835,819 | 9/1974 | Anderson, Jr. | 123/32 EB |
| 3,906,207 | 9/1975 | Rivere et al. | 123/32 EB |
| 3,909,601 | 9/1975 | Yamawaki et al. | 123/32 EB |

Primary Examiner—Charles J. Myhre
Assistant Examiner—Parshobam S. Lall
Attorney, Agent, or Firm—Cushman, Darby & Cushman

[57] ABSTRACT

An electronically-controlled fuel injection system for internal combustion engines is disclosed. Pulse width of a reference pulse generated in accordance with principal engine operating parameters is converted into a binary code and memorized. Oscillation signal having a frequency responsive to other engine operating parameters is counted starting in synchronism with the engine rotation until the count value thereof coincides with the memorized value. During the oscillation signal counting electromagnetically-operable injectors are opened sequentially in the engine suction stroke. The resultant fuel injection amount is dependent on the principal and other engine operating conditions.

7 Claims, 1 Drawing Figure

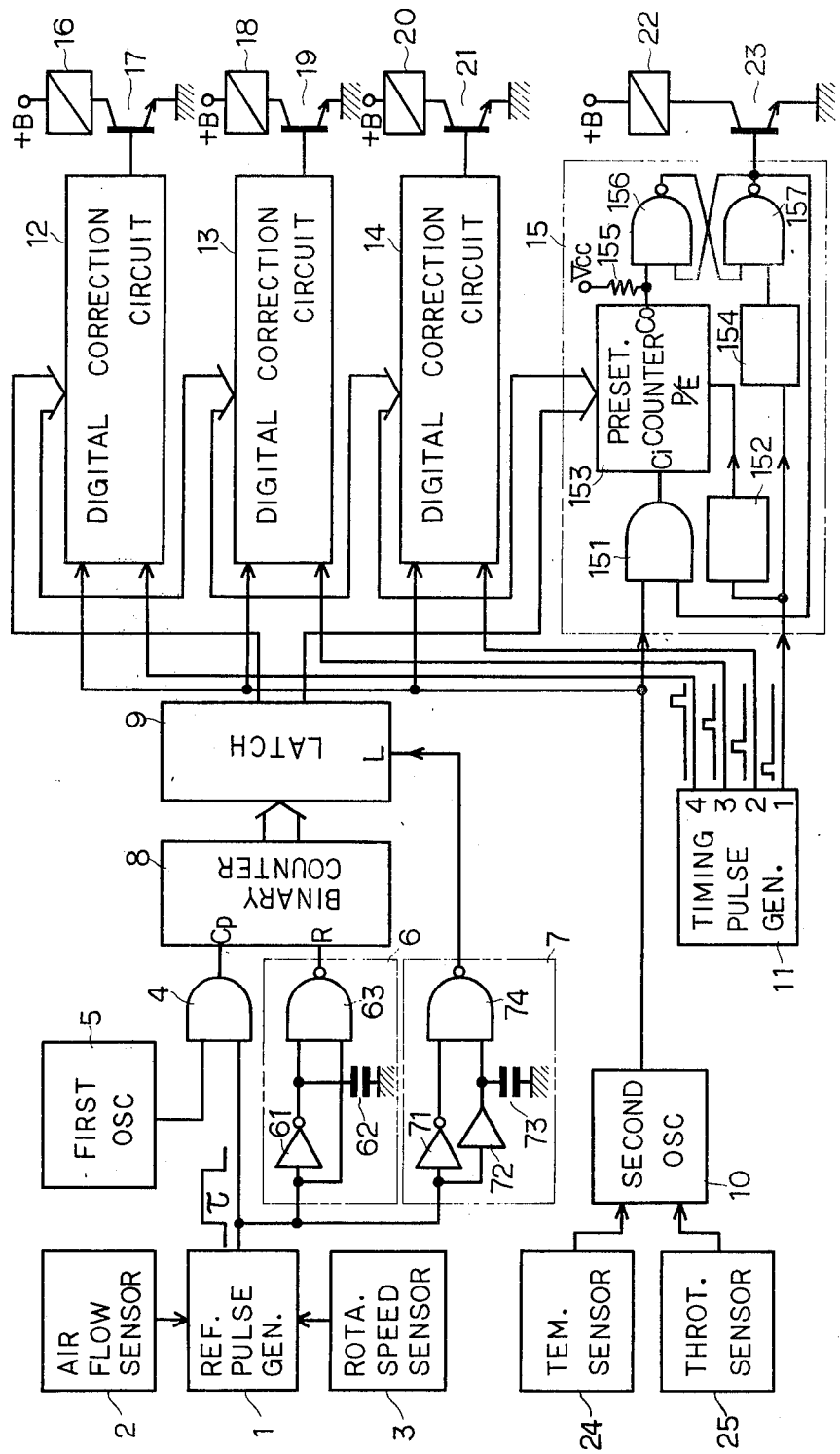

ELECTRONICALLY-CONTROLLED FUEL INJECTION SYSTEM

BACKGROUND OF THE INVENTION

1. Field of the Invention

The present invention is related to an electronically-controlled fuel injection system and more perticularly to the system with which overlapping sequential fuel injection in the engine suction stroke is enabled.

2. Description of the Prior Art

The electronically-controlled fuel injection system has been known well and is in practical use now. It is, however, a common practice to simultaneously operate at least two fuel injectors, because enough fuel injection duration at high engine rotational speed cannot be alloted to each fuel injector being arranged to be operated sequentially with one injection duration computing unit.

SUMMARY OF THE INVENTION

It is, therefore, a primary object of the invention to enable sequential fuel injection with one computing unit.

It is another object of the invention to memorize as a binary code signal a fuel injection duration determined in accordance with principal engine operating conditions.

It is a further object of the invention to digitally correcting memorized fuel injection duration in accordance with other engine operating conditions.

BRIEF DESCRIPTION OF THE DRAWING

The sole FIGURE is an electric wiring diagram, being partly in block diagram, according to the invention.

DETAILED DESCRIPTION OF THE PREFERRED EMBODIMENT

Referring to the FIGURE, a reference pulse generator 1 is connected to an air flow sensor 2 and a rotational speed sensor 3 to generate a reference pulse having a pulse width $\tau$ per engine one rotation. It is a well-known matter from the U.S. Pat. No. 3,750,631 that the air flow sensor 2 and the rotational speed sensor 3 are operatively coupled to an engine suction pipe and an engine shaft, respectively, and that the pulse width $\tau$ is computed in the reference pulse generator 1 depending upon air flow amount and engine rotational speed. The air flow amount and the engine rotational speed are principal engine operating parameters for determining fuel injection amount.

An AND gate 4 is connected to the reference pulse generator 1 at one input terminal thereof and to a first oscillator 5 at the other input terminal thereof. The first oscillator 5 is so constructed as to generate first clock pulses of a constant frequency. A reset pulse generator 6 comprising an inverter 61, a capacitor 62 and a NAND gate 63 is connected to the reference pulse generator 1 for generating a reset pulse in synchronism with the rising edge of the reference pulse. A latch pulse generator 7 comprising an inverter 71, a buffer 72, a capacitor 73 and a NAND gate 74 is also connected to the reference pulse generator 1 for generating a latch pulse in shynchronism with the falling edge of the reference pulse.

A binary counter 8 is connected to the AND gate 4 and to the reset pulse generator 6 for converting the pulse width $\tau$ of the reference pulse into a binary code. The binary counter 8 is reset in response to the reset pulse from the reset pulse generator 6 and thereafter starts to count the first clock pulses passing through the AND gate 4 during the pulse width $\tau$. The output binary code of the binary counter 8 at the falling edge of the reference pulse is proportional to the pulse width $\tau$ since the first clock pulse frequency is constant. A latch 9 (a memory) is connected to the binary counter 8 and to the latch pulse generator 7 for memorizing the output binary code of the binary counter 8 upon receipt of the latch pulse of the latch pulse generator 7. As the latch pulse generation is synchronized with the falling edge of the reference pulse, the latch 9 produces a binary code proportional to the reference pulse width $\tau$ and maintains it until next latch pulse generation.

A second oscillator 10 is connected to a temperature sensor 24 and to a throttle sensor 25. The temperature sensor 24 and the throttle sensor 25 are well known and produce respectively voltage signals indicative of the engine coolant temperature and the full opening of an engine throttle valve. Other sensors for detecting atmospheric air temperature and so forth may be connected to the second oscillator 10 as well. The second oscillator 10, being constructed as the known voltage-controlled oscillator, generates second clock pulses of a voltage-dependent frequency. The second clock pulse frequency accordingly varies with other engine operating parameters, engine coolant temperature and the throttle opening in this embodiment. A timing pulse generator 11 is operatively coupled to the engine for generating timing pulses synchronized with the engine suction stroke commencement. The timing pulse generator 11 in this embodiment generates four timing pulses sequentially, each timing pulse being indicative of suction stroke of each cylinder of the four-cylinder four-stroke engine.

Connected to the timing pulse generator 11 are digital correction circuits 12, 13, 14 and 15 which sequentially receive the timing pulse. The digital correction circuits 12, 13, 14 and 15 are commonly connected to the latch 9 and the second oscillator 10. Electromagnetically-operable fuel injectors 16, 18, 20 and 22 are, as known well, positioned to engine intake manifolds for injecting fuel into each cylinders. These fuel injectors 16, 18, 20 and 22 are connected in series with respective amplifying transistors 17, 19, 21 and 23 between the power supply source +B and the ground. The transistors 17, 19, 21 and 23 are respectively connected to the digital correction circuits 12, 13, 14 and 15 to be controlled thereby.

In the digital correction circuit 15 an AND gate 151 is connected between the second oscillator 10 and a presettable counter 153, whereas a preset pulse generator 152 is connected between the timing pulse generator 11 and the presettable counter 153. The presettable counter 153 is connected to the latch 9 to be supplied with the above-described memorized binary code. An R-S flip-flop comprising NAND gates 156 and 157 is connected to the presettable counter 153 directly at one input terminal and to the timing pulse generator 11 via a set pulse generator 154 at the other input terminal. The input terminal of the NAND gate 156 is constantly supplied with the regulated voltage Vcc via a resistor 155 and the output terminal of the NAND gate 157 is connected to the transistor 23 and the AND gate 151.

Other digital correction circuits 12, 13 and 14 are constructed in the same manner as the digital correction circuit 15 except that they are connected to the timing pulse generator 11 to be sequentially supplied with the timing pulse therefrom.

The preset pulse generator 152, being constructed in the same manner as the reset pulse generator 6, generates the preset pulse in synchronization with the rising edge of the first timing pulse applied from the timing pulse generator 11. The presettable counter 153 reads in the output binary code of the latch 9 as a preset value at the time when the preset pulse is applied to the preset enable terminal (P/E). The set pulse generator 154, being constructed in the same manner as the latch pulse generator 7, thereafter generates the set pulse in synchronization with the falling edge of the first timing pulse applied from the timing pulse generator 11. In response to the set pulse the R-S flip-flop is driven into the set condition during which the AND gate 151 is allowed to pass the second clock pulses therethrough.

The presettable counter 153 counts the second clock pulses coming in to the carry-in terminal (Ci) and generates a reset pulse at the carry-out terminal (Co) when the count value thereof becomes equal to the preset value. The R-S flip-flop is eventually driven into the reset condition upon the reset pulse generation. It would be understood with ease that the R-S flip-flop is maintained in the set condition longer as the second clock pulse frequency becomes lower. The set condition duration of the R-S flip-flop, being proportional to the reference pulse width $\tau$ and inversely proportional to the second clock pulse frequency, varies not only with the principal engine operating parameters but with the other engine operating parameters.

During the set condition duration of the R-S flip-flop the transistor 23 is rendered conductive and the fuel injectors 22 is energized to inject fuel in the engine suction stroke. The fuel injection amount is determined by the injection duration which is principally calculated in the reference pulse generator 1 and thereafter corrected in the digital correction circuit 15.

Other digital correction circuits 14, 13 and 12 also correct the reference pulse width $\tau$ upon receipt of the respective second, third and fourth timing pulses in the same manner as described with reference to the digital correction circuit 15. And as a result the fuel injectors 20, 18 and 16 are sequentially energized to inject the fuel into the engine cylinders in the suction stroke thereof. Each fuel injection is thus triggered by the respective timing pulses and terminated irrespective of the timing pulses, fuel injection overlapping which is often required at the engine high rotation is made possible.

What I claim is:

1. An electronically controlled fuel injection system for a multi-cylinder internal combustion engine comprising:
    a reference pulse generator for generating a reference pulse, pulse width thereof being corresponding to some engine operating conditions;
    a first oscillator for generating first clock pulses of a constant frequency;
    a gate, connected to said reference pulse generator and said first oscillator, for passing said first clock pulses during said reference pulse width;
    a binary counter, connected to said gate, for counting said first clock pulses passed through said gate and converting said reference pulse width into a binary code;
    a latch, connecting to said binary counter, for memorizing said binary code proportional to said reference pulse width;
    a second oscillator for generating second clock pulses of a frequency varying with other engine operating conditions;
    a timing pulse generator for generating timing pulses, each thereof being synchronized with the suction stroke of each cylinder;
    digital correction circuits, connected to said second oscillator, said timing pulse generator and said latch, for counting said second clock pulses in response to said timing pulses until the count value thereof reaches said binary code memorized by said latch and sequentially generating injection pulses during counting operation thereof, each pulse width thereof being proportional to said reference pulse width and varying with said second clock pulse frequency; and
    fuel injectors, connected respectively to said digital correction circuits, for injecting fuel in response to said injection pulses synchronized with said timing pulses.

2. A fuel injection system as set forth in claim 1, wherein each of said digital correction circuits comprises:
    a presettable counter, connected to said second oscillator and said latch and adapted to preset said binary code of said latch in response to one of said timing pulses, for counting said second clock pulses in response to said one of said timing pulses until the count value thereof becomes equal to the preset value thereof; and
    an R-S flip-flop, connected to said presettable counter and said timing pulse generator, for generating said injection pulse during second clock pulse counting of said presettable counter.

3. An electronically-controlled fuel injection system as set forth in claim 1, further comprising:
    first detection means connected to said reference pulse generator for detecting air flow amount and rotational speed of said engine as said some engine operating conditions to thereby control said reference pulse width; and
    second detection means connected to said second oscillator for detecting engine temperature and throttle opening of said engine as said other engine operating conditions to thereby control the frequency of said second clock pulses.

4. An electronically-controlled fuel injection system for a multi-cylinder internal combustion engine comprising:
    a reference pulse generator for generating a reference pulse having a pulse width dependent upon air flow amount and rotational speed of said engine;
    a counter, connected to said reference pulse generator, for converting said reference pulse width into a plural bit of code signal by counting clock pulses of constant frequency during said reference pulse width;
    a memory, connected to said counter, for memorizing said code signal proportional to said reference pulse width;
    oscillation means for generating oscillation signals of a frequency variable with other engine operating parameters;

a timing pulse generator for generating timing pulses, each thereof being indicative of fuel injection commencement of each engine cylinder;

a plurality of conversion means, commonly connected to said memory, said timing pulse generator and said oscillation means, for counting said oscillation signals and converting said code signal into injection pulses, each thereof being synchronized with each of said timing pulses and having a pulse width varying with said oscillation signal frequency and said code signal; and a plurality of fuel injectors, each thereof being connected to each of said conversion means, for sequentially injecting fuel in response to said injection pulses.

5. A fuel injection system as set forth in claim 4, wherein each of said conversion means includes a counter for counting said oscillation signals until the count value thereof reaches said code signal of said memory to thereby determine the pulse width of said injection pulse.

6. An electronically-controlled fuel injection system as set forth in claim 4, wherein said oscillation means includes:

a temperature sensor for producing temperature output signal indicative of engine temperature;

a throttle sensor for producing throttle output signal indicative of throttle opening; and an oscillation circuit for generating said oscillation signals, the frequency of which is varied by said temperature output signal and said throttle output signal.

7. An electronically controlled fuel injection system for a multi-cylinder internal combustion engine comprising:

an airflow sensor for producing an electrical signal which varies as a function of airflow through an engine suction pipe;

a speed sensor for producing an electrical signal which varies as a function of engine speed;

a reference pulse generator connected to said speed and airflow sensors for producing a reference pulse train with each pulse having a width dependent upon airflow and speed;

a first oscillator for producing clock pulses at a constant frequency;

an AND logic gate for receiving said clock pulses and said pulse train;

a binary counter connected to the output of said AND gate;

a reset pulse generator connected between said reference pulse generator and said binary counter for producing a reset pulse in synchronism with the leading edge of each reference pulse;

a latch connected to said counter for storing the count in said counter upon receipt of a latch pulse;

a latch pulse generator connected between said reference pulse generator and said latch for producing a latch pulse in synchronism with the falling edge of each reference pulse;

a temperature sensor for producing an electrical signal which varies as a function of engine coolant temperature;

a throttle sensor for producing an electrical signal indicating full opening of an engine throttle valve;

a second oscillator for generating second clock pulses at a frequency dependent upon the signals produced by said temperature and throttle sensors;

a timing pulse generator for generating timing pulses synchronized with engine suction displacement;

a plurality of digital correction circuits, each connected to said latch, said timing pulse generator and said second oscillator for producing a fuel injection signal, each circuit including a preset counter which is preset to the count stored in said latch, and means for applying said second clock to said preset counter;

a fuel injector connected to each correction circuit for injecting fuel in accordance with the output of that circuit.

* * * * *